Patented June 9, 1953

2,641,546

UNITED STATES PATENT OFFICE 2,641,546

PROCESS FOR THE MANUFACTURE OF FROZEN COMESTIBLES

Clinton W. Decker, Pullman, Wash.

No Drawing. Application July 27, 1949, Serial No. 107,147

8 Claims. (Cl. 99—136)

This invention relates to a process for reducing the tendency in frozen comestibles, particularly ice cream and ice milk, to develop sandiness and at the same time increasing its food value by stepping up the solids and serum solids or milk solids-not-fat content thereof and to the product produced by said process. This is accomplished by inducing lactose crystallization in the frozen comestible or the development of crystallization of the lactose in an impalpable state or in such manner as the lactose crystals are not detectable to taste and the comestible has a smooth even consistency and texture.

The milk solids-not-fat or serum solids content of frozen comestibles are normally limited in commercial practice to an average value of approximately 11% of the total weight in ice cream and 14% in ice milk, because of the tendency of the milk sugar lactose in solution to crystallize out forming crystals which are palpable and discernable or detectable to the taste. This is particularly true when the serum solids content of the mix is relatively high and the comestible is kept in a dispensing cabinet at temperatures of $+8°$ F. to $+10°$ F. over a considerable period of time or has been subjected to fluctuations of storage temperatures known as "heat shocking" where the comestible has been allowed to warm to a partially melted state and is then refrozen. Palpable lactose crystals are tasteless and relatively insoluble and because of these properties have a dry gritty taste in the mouth. This condition is known in the trade and dairy literature as "sandiness."

By inducing lactose crystals in the serum solids of a frozen comestible to crystallize in impalpable form, not detectable by taste, it is possible to increase the serum solids or milk solids-not-fat to almost any value desired within limits of consumer acceptance and without fear of sandiness developing.

Likewise other solids of frozen comestibles including sugars, butterfat, flavoring materials, stabilizers, emulsifiers, antioxidants and the like may also be increased as desired without serious likelihood of sandiness development. The increase of such solids in frozen comestibles under ordinary and conventional processing would leave less water to hold the lactose in solution and would, therefore, increase the danger of sandiness in the dispensing cabinet.

It has been proposed heretofore by workers in this art that the development of sandiness in ice cream may be retarded or prevented by withholding a portion of the serum solids from the mix in the form of skim milk powder and adding this powder to the freezer after the mix has been partially frozen. The skim milk powder when added in this manner is distributed throughout the partially frozen mix, a portion going into solution and the remaining portion combining with the mixture in the ice cream to produce profuse small lactose crystals widely distributed throughout the mix. The production of these crystals usually takes place within 4 or 5 hours after the ice cream is frozen and placed in the hardening room. Normally the recommendation for adding powder in this fashion is in amounts from 2½ pounds of skim milk to 5 gallons of ice cream and the serum solids content of the ice cream mix is purposely low in order that the addition of powder will bring it up to normal values.

The instant invention differs from one in which milk powder is added to the freezer, as the total content of serum solids is incorporated initially in the mix. Where skim milk powder is added it is introduced in considerable quantities (2½ pounds to 5 gallons of mix) while in the instant process the crystalline lactose is added in minute quantities. Also it is not necessary that this lactose be added to the freezer or during the freezing operation but may be combined with the mix prior to freezing, during the freezing operation, or after the mix has been frozen.

The instant invention, therefore, proposes the processing of frozen comestibles to induce lactose crystallization in an impalpable state by the following method:

Crystalline lactose in the form of fine lactose particles may be added to the mix before freezing, to the comestible while it is being frozen or to the comestible after it is frozen, thus there is contemplated such addition at any stage of its processing or freezing or after freezing until the frozen product has been packaged.

Example I

Crystalline lactose in discrete particles may be added to the pasteurized cooled fluid mix in the holding tank or in the line as it leaves the holding tank or to the fluid mix anywhere between the holding tank and freezer barrel.

Example II

Crystalline lactose in discrete particles may be added directly into the fluid mix in the freezer or after the mix is partially frozen.

Example III

Crystalline lactose in discrete particles may be added to the mix as it leaves the freezer either by hand stirring or mechanical stirring as in a fruit feeder.

Example IV

Crystalline lactose in discrete particles may be added anywhere between the outlet of the freezer and up to and including the filled package.

The optimum amount of added lactose required to cause impalpable lactose crystal formation, as herein contemplated, is approximately one ounce or less per five gallons of fluid mix, but this value is not to be too strictly construed or interpreted as a limiting value. The crystalline lactose employed as a seeding material is preferably added as a dry powder or in combination with skim milk powder, sweetened condensed skim or whole milk.

The reason for this formation of impalpable lactose crystals in the frozen comestible resulting from the addition or seeding of lactose crystals is not exactly known because of the difficulty of studying the product at low temperatures. Tests indicate that there appears to be formed crystal nuclei which are submicroscopic in size. The source of these submicroscopic nuclei is the added crystalline lactose which, being a relatively insoluble sugar, clumps readily when added to the fluid mix. These clumps for some reason are able to partially survive agitation during mixing and freezing and only gradually go into solution during the hardening process. For want of better terminology they may be termed "pockets of supersaturation" which act as submicroscopic crystal nuclei. Comestibles made according to this invention, when taken from the hardening room and placed in a dispensing cabinet at temperatures of $+8°$ F. to $+10°$ F. develop after 4 to 5 days a myriad of impalpable lactose crystals. It would appear that enough water has been melted at the higher temperature of dispensing to allow the lactose in solution to migrate and crystallize out in the areas of those submicroscopic nuclei. Crystallization in these newly formed nuclei is in crystal size which is microscopically determinable but is impalpable to taste. Evidently the number of crystals present and the condition under which crystallization takes place limits the size of individual crystal formation.

From numerous experimental tests made in an attempt to determine the phenomenon which takes place and to substantiate the advantages claimed for the invention the following observations have been selected. Frozen ice cream or ice milk treated with lactose crystals in amounts suggested when examined directly after the hardening process fail to show impalpable lactose crystals with the exception of a few small clumps thought to be what remained of the added lactose in the form of undissolved material. This was true when the mix was frozen either in a batch or continuous freezer and hardened within the range of normal hardening conditions, namely, from $+8°$ F. to $-18°$ F. In none of the tests where ice cream or ice milk was hardened to ordinary commercial hardening conditions of $-10°$ F. or lower did the product show the development of impalpable lactose crystals in quantity when examined under a microscope in plane or polarized light. No microscopic impalpable crystals developed in ice cream or ice milk held for periods of 3 to 4 months at hardening temperatures of $-10°$ F. or less.

When, however, the comestible, such as ice cream or ice milk frozen according to the teachings of the process herein described, was taken from the hardening room at temperatures of $-10°$ F. or less and was placed in a dispensing cabinet maintained at normal temperatures of from $+8°$ F. to $+10°$ F. within a few days (2 to 6 days) there appeared a myriad of exceedingly small impalpable lactose crystals. When examined under a microscope using plane and polarized light the impalpable lactose crystals were exceedingly small, solid, needle-like and approximately $1\mu$ in length and $0.5\mu$ in width. They appear to grow in size and number as long as they are kept in the dispensing cabinet. The scope of the crystalline development gradually widens producing an area simulating a triangle or diamond shape until equilibrium is reached for the particular temperature of the ice cream or ice milk. By this time a large portion of the supersaturated lactose has been crystallized out. The period for the establishment of this equilibrium is somewhat difficult to ascertain because of the immense number and exceedingly small size of the impalpable lactose crystals. Under extreme holding times, from 3 to 4 months in a dispensing cabinet, crystals were measured which grew to $7\mu$ in length. The literature pertaining to crystallization in condensed milk recognizes that a crystal size of approximately $10\mu$ for lactose is the critical dividing line between palpable and impalpable size with those below $10\mu$ being impalpable.

Further tests were made to establish the efficiency of the process utilizing a serum solids content of 16% for ice cream and 20% for ice milk and as a part of these tests the products were held in dispensing cabinets for periods of 3 to 4 months without the development of sandiness. These serum solid values are approximately $1\frac{1}{2}$ times the normal or average solids values which are used commercially by the ice cream industry. If mixes with these high percentages of serum solids were frozen by ordinary processes and freezing methods and were kept in the dispensing cabinet for the period mentioned sandiness would develop within from 3 days to a week. It is, therefore, significant that a time element of several days is involved in the formation of impalpable lactose crystals when the frozen mix is transferred from the hardening room to a dispensing cabinet. This is true as well with ice cream or ice milk which is hardened at only $+8°$ F. or ordinary dispensing cabinet temperatures instead of $-10°$ F. which is the normal temperature used commercially. Since it is necessary to place the ice cream hardened at $-10°$ F. or lower in a dispensing cabinet maintained at temperatures of from $+8°$ F. to $+10°$ F. and allow several days to elapse before the impalpable lactose crystals appear it becomes apparent that enough water must have melted with the increased temperature in the dispensing cabinet to raise the viscosity of the matrix material to a degree which allows lactose crystallization to occur in the fashion described.

It is a notorious fact that in commercial operations ice cream and ice milk as well as other frozen comestibles reach a saturation point for lactose during freezing even in a mix as low as 6% serum solids and 30% total solids. Lactose crystallization in such mixes is evidently retarded by the extreme viscosity of the unfrozen portion and mechanical obstruction of solids in the mix causing the frozen mix to remain in a highly viscous condition or what may be termed as a supersaturated glass or non-crystalline state.

Since untold millions of impalpable lactose crystals seem to appear at about the same time it is logical to assume that there must be pockets of supersaturation or submicroscopic crystal centers formed from which these myriads of crystals are generated and change from submicroscopic to microscopic in size in the several days which elapse while the comestible is maintained in the dispensing cabinet. Whether the few small clumps of the impalpable crystals found in the hardened samples of ice cream act as a trigger or seed material in setting off this crystalline formation is difficult to ascertain and prove. The degree of agitation in the mix line to the freezer and in the freezer itself precludes the possibility of the greater part of these crystals remaining in undissolved palpable crystalline state.

Approximately 80% of the water is frozen in ice cream at $+8°$ F. and about 88% at $-10°$ F. and within this range of temperatures lactose crystallization seems to be critical. Since the crystalline lactose can be added at several places in the processing without changing the resultant effect, the degree of agitation to which the lactose is subjected will vary and seems to have no determinable effect upon the phenomenon of impalpable lactose crystallization. The viscosity of the frozen portion of the ice cream is still quite high at 8° F. and too high to allow a wide movement of lactose molecules. It is, therefore, believed that the simultaneous development of impalpable lactose crystals would seem to occur largely from pockets of supersaturation or submicroscopic crystal centers where less molecular movement would be necessary.

It is possible that the crystalline lactose could be added to the mix in the storage vat and agitated violently enough and for a sufficient period of time to dissolve it in the mix, which might avoid the formation of pockets of supersaturation or submicroscopic seed centers as previously described. It is, therefore, important in processing a mix according to the invention to add the crystalline lactose to the mix at a stage of processing to insure the phenomenon of impalpable lactose crystallization.

Having thus described my invention, I claim:

1. A process for reducing sandiness in frozen comestibles of the class consisting of ice cream and ice milk comprising the steps of adding to and intimately mixing with the comestible liquid mix after pasteurization and prior to freezing a small amount of material consisting of lactose crystals in discrete form, and then freezing the mix.

2. A process as in claim 1 in which the lactose crystals added to the mix prior to freezing are in this instance added and intimately mixed during freezing of the mix.

3. A process as in claim 1 in which the lactose crystals added to the mix prior to freezing are in this instance added and intimately mixed after the mix has been partially frozen.

4. A process as in claim 1 in which the lactose crystals added to the mix prior to freezing are in this instance added and intimately mixed after the mix has been frozen and before packaging.

5. A process as in claim 1 wherein the lactose is added on the basis of approximately one ounce per five gallons of liquid mix.

6. A process as in claim 2 wherein the lactose is added on the basis of approximately one ounce per five gallons of liquid mix.

7. A process as in claim 3 wherein the lactose is added on the basis of approximately one ounce per five gallons of liquid mix.

8. A process as in claim 4 wherein the lactose is added on the basis of approximately one ounce per five gallons of liquid mix.

CLINTON W. DECKER.

References Cited in the file of this patent

UNITED STATES PATENTS

| Number | Name | Date |
| --- | --- | --- |
| 2,193,950 | Turnbow | Mar. 19, 1940 |
| 2,307,234 | Otting et al. | Jan. 5, 1943 |
| 2,433,850 | Leviton | Jan. 6, 1948 |
| 2,500,315 | Koerver | Mar. 14, 1950 |

OTHER REFERENCES

Hunziker, O. F., "Condensed Milk and Milk Powder," Sixth Edition, 1946, pages 164 to 171, published by author, La Grange, Illinois.